United States Patent
Stammen et al.

(10) Patent No.: US 11,400,509 B2
(45) Date of Patent: Aug. 2, 2022

(54) SHELL WITH EXPANDABLE BUBBLE AND TOOLING THEREFOR

(71) Applicant: Stolle Machinery Company, LLC, Centennial, CO (US)

(72) Inventors: Dennis C. Stammen, Brookville, OH (US); Mark Mitchell, Sidney, OH (US); Christopher Macke, Sidney, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 195 days.

(21) Appl. No.: 16/881,071

(22) Filed: May 22, 2020

(65) Prior Publication Data

US 2020/0282445 A1    Sep. 10, 2020

Related U.S. Application Data

(63) Continuation of application No. 15/877,441, filed on Jan. 23, 2018, now abandoned.

(51) Int. Cl.
| | | |
|---|---|---|
| *F16B 5/04* | (2006.01) | |
| *B65D 17/28* | (2006.01) | |
| *B21D 51/38* | (2006.01) | |

(52) U.S. Cl.
CPC ......... *B21D 51/38* (2013.01); *B65D 17/4012* (2018.01); *F16B 5/045* (2013.01); *B65D 2517/0016* (2013.01)

(58) Field of Classification Search
CPC ........ B65D 17/4012; B65D 2517/0014; B65D 2517/0016; F16B 5/045; B21D 51/26; B21D 51/38
See application file for complete search history.

(56) References Cited

U.S. PATENT DOCUMENTS

| | | |
|---|---|---|
| 3,191,797 A | 6/1965 | Fraze |
| 3,638,597 A | 2/1972 | Brown |
| 3,750,606 A | 8/1973 | Schultz |
| 4,145,801 A | 3/1979 | Schrecker et al. |
| 5,174,146 A | 12/1992 | Heurteboust et al. |
| 2006/0071005 A1 | 4/2006 | Bulso et al. |
| 2008/0014050 A1 | 1/2008 | Butcher et al. |

FOREIGN PATENT DOCUMENTS

GB    938253 A    10/1963

OTHER PUBLICATIONS

European Patent Office, EP Patent Application No. 19743254.5, Communication Pursuant to Rule 164(1) EPC & Supplementary Partial European Search Report Supplemental, dated Sep. 30, 2021, 14 pages.

European Patent Office, EP Patent Application No. 19743327.9, Communication Pursuant to Rule 164(1) EPC & Supplementary Partial European Search Report Supplemental, dated Oct. 4, 2021, 14 pages.

*Primary Examiner* — Andrew T Kirsch
(74) *Attorney, Agent, or Firm* — Eckert Seamans Cherin & Mellott LLC

(57) ABSTRACT

A shell including a central panel with an expandable bubble disposed thereon is provided. The use of an expandable bubble allows for an expandable rivet button and thereafter an expandable rivet that has an enhanced overlap of a tab body. Such an expandable rivet allows for the use of a metal sheet with a thinner base thickness.

12 Claims, 11 Drawing Sheets

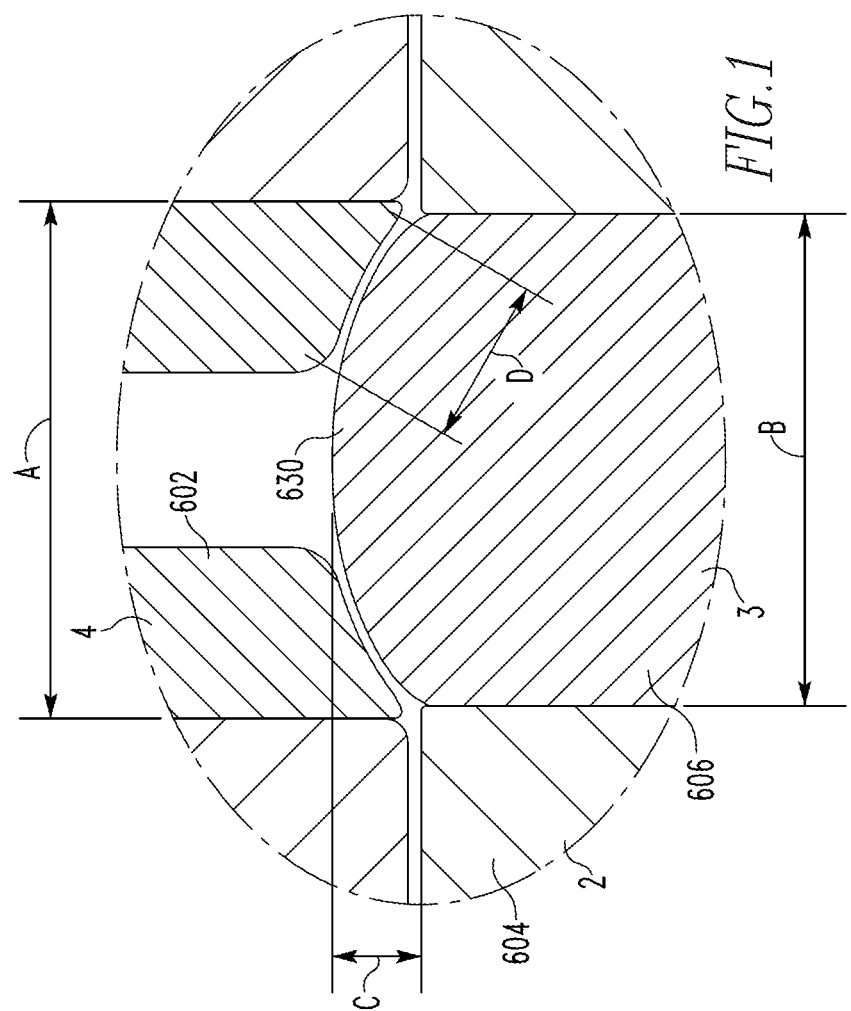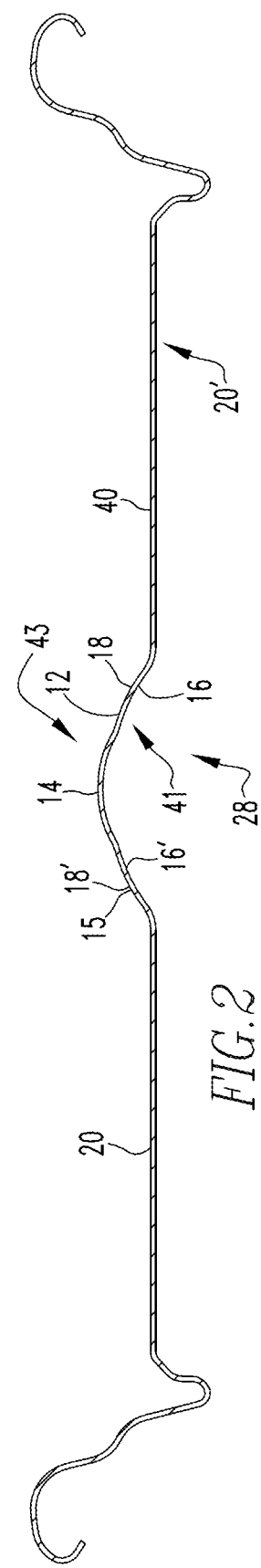

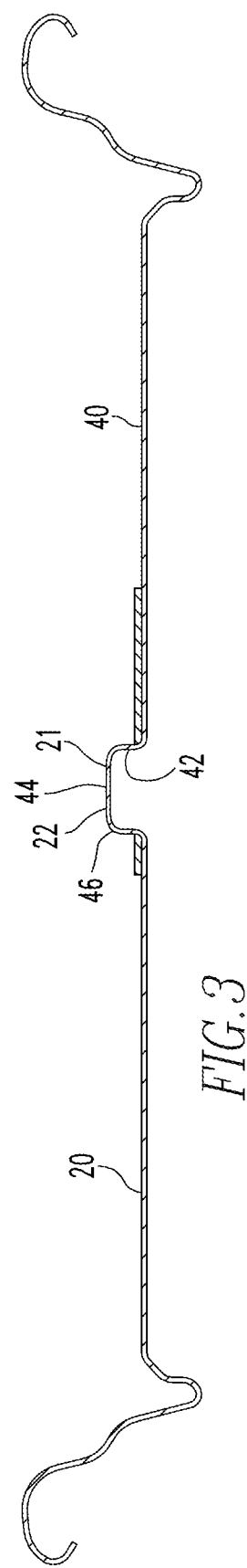
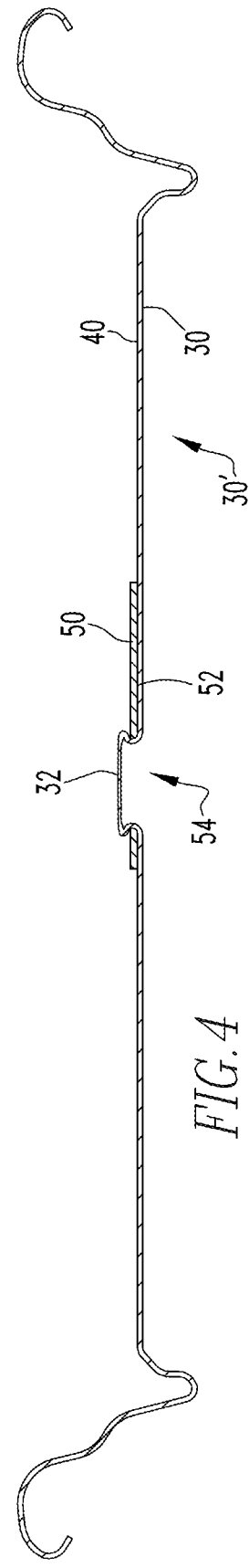

SHELL WITH EXPANDABLE BUBBLE AND TOOLING THEREFOR

CROSS REFERENCE TO RELATED APPLICATION

This application is a continuation application and claims priority to U.S. patent application Ser. No. 15/877,441, filed Jan. 23, 2018, entitled, SHELL WITH EXPANDABLE BUBBLE AND TOOLING THEREFOR.

BACKGROUND OF THE INVENTION

Field of the Invention

The disclosed and claimed concept relates to can ends and, more particularly, to shells and can ends made from a sheet material with a reduced base thickness. The disclosed concept also relates to a tooling assembly and associated methods for providing such shells and can ends.

Background Information

Metallic containers (e.g., cans) are structured to hold products such as, but not limited to, food and beverages. Generally, a metallic container includes a can body and a can end. The can body, in an exemplary embodiment, includes a base and a depending sidewall. The can body defines a generally enclosed space that is open at one end. The can body is filled with product and the can end is then coupled to the can body at the open end. The container is, in some instances, heated to cook and/or sterilize the contents thereof. This process increases the internal pressure of the container. Further, the container contains, in some instances, a pressurized product such as, but not limited to a carbonated beverage. Thus, for various reasons, the container must have a minimum strength.

Generally, the strength of the container is related to the thickness of the metal from which the can body and the can end is formed, as well as, the shape of these elements. This application primarily addresses the can ends rather than the can bodies. The can ends are "easy open" ends which include a tear panel and a tab. The tear panel is defined by a score profile, or score line, on the exterior surface (identified herein as the "public side") of the can end. The tab is attached (e.g., without limitation, riveted) adjacent the tear panel. The pull tab is structured to be lifted and/or pulled to sever the score line and deflect and/or remove the severable panel, thereby creating an opening for dispensing the contents of the container.

When the can end is made, it originates as a blank, which is cut from a sheet metal product (e.g., without limitation, sheet aluminum, sheet steel). As used herein, a "blank" is a portion of material that is formed into a product; the term "blank" is applicable to the portion of material until all forming operations are complete. In an exemplary embodiment, the blank is formed into a "shell" in a shell press. As used herein, a "shell," or a "preliminary can end," is a construct that started as a generally planar blank and which has been subjected to forming operations other than scoring, paneling, rivet forming, and tab staking, as is known. The blank/shell is further formed into a can end in a conversion press. That is, further forming operations that convert a shell into a can end include scoring, paneling, rivet forming, and tab staking, as is known. In another embodiment, sheet material is cut and formed into a can end in a single press that performs all of the operations of both a shell press and a conversion press.

A shell press and/or a conversion press includes a number of tool stations where each station performs a forming operation (or which may include a null station that does not perform a forming operation). In a shell press, the blank moves through successive stations and is formed into the "shell." That is, as a non-limiting example, a first station cuts the blank from the sheet material, a second station forms the blank into a cup-like construct with a depending sidewall, a third station forms the depending sidewall into a countersink and a chuck sidewall, and so forth. In a conversion press, the shell is formed into a can end. That is, at least one station forms a "bubble." A bubble, as used herein, is the construct that is formed into a "rivet button" which, in turn, is formed into the rivet that couples the tab to the can end. As such, the formation of the bubble affects the characteristics of the rivet button and the rivet. As the shell advances from one tool station to the next, conversion operations such as, for example and without limitation, rivet forming, paneling, scoring, embossing, and tab staking (i.e., coupling a tab to the shell via the rivet), are performed until the shell is fully converted into the desired can end and is discharged from the press. Further, the process of creating a rivet and coupling a tab thereto are disclosed in U.S. Pat. No. 4,145,801 and the Description of the Preferred Embodiments in U.S. Pat. No. 4,145,801 is incorporated herein by reference. Accordingly, a shell/can end is formed in a press having a plurality of stations. The blank is moved intermittently, or as used herein "indexed," through the number of stations. That is, the blank is moved and stops at each station wherein a forming operation is performed (it is understood that some stations are "null" stations that do not perform a forming operation). In one known embodiment, a conversion press is structured to cut a blank from sheet material and form a can end.

A conversion press includes a number of bubble stations that are structured to form a bubble on the shell, a number of rivet stations that are structured to convert the bubble into a rivet button, and a staking station that is structured to couple a tab to the shell by staking (or flattening) the rivet button into a rivet and thereby completing the can end. In an exemplary embodiment, a conversion press includes one bubble station, a number of rivet stations, and a number of other forming stations structured to form known elements of a can end such as, but not limited to, scoring, paneling, and lettering, as well as a staking station wherein a tab is coupled to the shell by the rivet.

In the can making industry, large volumes of metal are required in order to manufacture a considerable number of cans. Thus, an ongoing objective in the industry is to reduce the amount of metal that is consumed. Efforts are constantly being made, therefore, to reduce the original thickness or gauge (sometimes referred to as "down-gauging") of the stock material from which can ends, tabs, and can bodies are made. Presently, can ends are made from sheet metal such as, but not limited to, aluminum and steel as well as alloys including those metals. The minimum base thickness for these materials is 0.0082 inch. This is a problem and using a metal material with a thinner base thickness would solve this problem.

Use of a material with a thinner base thickness, however, generates other problems such as, but not limited to, failure of the can end at the rivet. That is, a rivet formed from a material with a base thickness less than 0.0082 inch cannot hold the tab to the can end. This is a problem.

Alternatively, material with a thicker base thickness can be thinned to have a thinner, or partially thinner, final thickness that is less than the base thickness. However, as less material (e.g., thinner gauge) is used, problems arise that require the development of unique solutions. Further, the process of forming the can bodies and can ends cause stress in the material thereby damaging the can bodies or can ends during the forming thereof. Further, prior to staking, the known rivet buttons have a tapered cross-sectional shape. When a rivet button with such a shape is staked, the rivet button is prone to collapse unevenly. That is, a portion of the rivet may extend over the tab more in one direction than another. This is a problem.

It is understood that the characteristics (i.e., size, shape, contour, etc.) of the bubble/rivet button affect the performance of the final rivet. Further, it is understood that seemingly small changes to the characteristics of the bubble/rivet button, as well as the tooling that forms the bubble/rivet button, affect the performance of the final rivet including strengthening the rivet and allowing for the use of a material with a thinner base thickness.

Further, as shown in FIG. 1, a press structured to form a known aluminum beverage can; that is, a can structured to contain a beverage such as beer or carbonated beverages, i.e., a "soda" or "pop," and which is typically a twelve ounce container, includes a bubble station lower cap 2 and a bubble station lower punch 3 on a lower tooling assembly and a torroid bubble station upper punch 4 on an upper tooling assembly. During the formation of a bubble, and when the bubble station upper punch 4 is at a coining distance, as defined below, the press is configured as shown. Moreover, for a prior art press, the following dimensions are known.

| Element Characteristic | Reference Letter | Prior Art |
| --- | --- | --- |
| Bubble station upper punch diameter | A | 0.3585 inch |
| Bubble station lower punch diameter | B | 0.3520 inch |
| Bubble station lower punch height | C | 0.0654 inch |
| Coining surface length | D | 0.1015 inch |
| Total coining surface area | | 0.0768 inch $^2$ |

A press with elements having these dimensions is, as used herein, a "standard beverage can press" and forms a known bubble that does not include any optimized dimensions and cannot form an "expandable bubble" as defined below. As used herein, the "rivet station lower punch height" is measured as the height of the dome-like upper surface above the cylindrical portion of the rivet station lower punch 3. Further, the "coining surface length" is, as used herein, the length of the portion of the rivet station upper punch 4 that "coins" (as defined below) a portion of a blank and as viewed in cross-section, as shown. It is further noted that in this configuration, the standard beverage can press has a rivet station lower punch diameter/height ratio of 5.38:1 and a rivet station upper punch coining surface length/diameter ratio of 0.283:1. A press having these ratios is, as used herein, a "standard beverage can press" and forms a known bubble that does not include any optimized dimensions and cannot form an "expandable bubble" as defined below.

There is, therefore, a need to decrease the amount of material in the rivet so as to decrease the total amount of material used to create the can end. Further, there is a need to form can ends from a material having a base thickness of less than 0.0082 inch. There is a further need for a press structured to form an "expandable bubble" as defined below, which becomes an expandable rivet button and then an expanded rivet.

SUMMARY OF THE INVENTION

The disclosed and claimed concept provides a shell including a central panel and an expandable bubble disposed thereon. The expandable bubble is formed into an expandable rivet button and, thereafter, into an expandable rivet that has an enhanced overlap of the tab body. Such an expandable rivet allows for the use of a metal sheet with a thinner base thickness, thereby solving the problems stated above. Thus, use of a shell with an expandable bubble and/or an expandable rivet button also solves the problems stated above. For example, use of a shell with an expandable bubble and/or an expandable rivet button allows the shell/can end to be formed from sheet material having a base thickness of less than 0.0082 inch and, in an exemplary embodiment, allows for the use of sheet material having a base thickness of about 0.0078. This solves the problems noted above.

Further, the bubble formed by the number of bubble stations and the rivet button formed by the three rivet stations in the exemplary embodiment described above could be formed by a different number of stations. That is, the process of forming the bubble and the rivet button is not limited to a specific number of stations. Accordingly, as used herein, so long as any number of stations form a shell having an expandable bubble and/or an expandable rivet button with the characteristics described and/or claimed below, then those stations are collectively a "station," as used herein.

BRIEF DESCRIPTION OF THE DRAWINGS

A full understanding of the invention can be gained from the following description of the preferred embodiments when read in conjunction with the accompanying drawings in which:

FIG. 1 is a schematic cross-sectional side view of selected press elements.

FIG. 2 is a cross-sectional view of a shell with an expandable bubble.

FIG. 3 is a cross-sectional view of a shell with an expandable rivet button.

FIG. 4 is a cross-sectional view of a can end with an expanded rivet.

DESCRIPTION OF THE PREFERRED EMBODIMENTS

Figure 5:
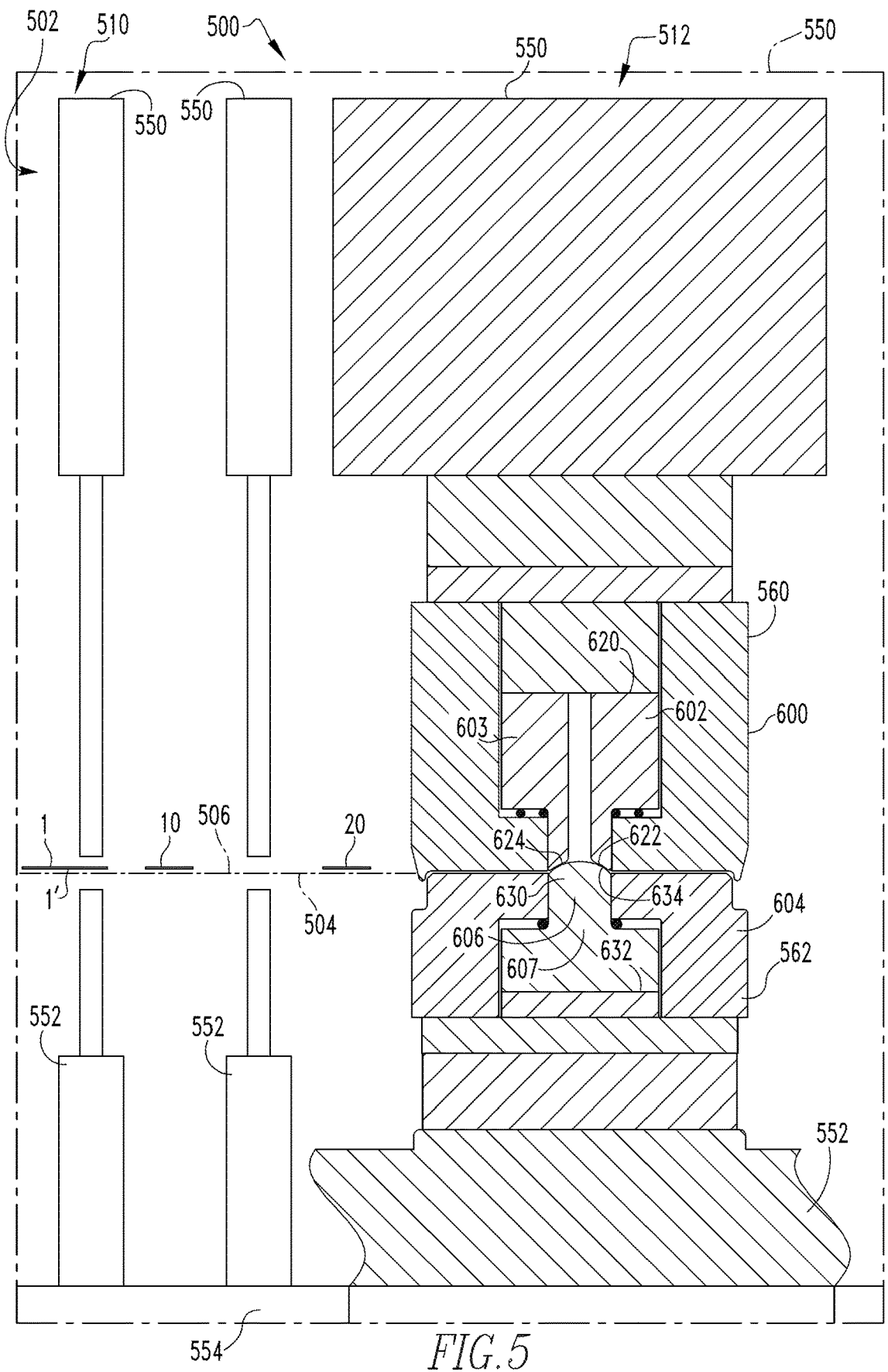
FIG. 5 is a schematic cross-sectional view of a press.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is resting on a second element (s) or assembly(ies) in a manner that allows the first element/ assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/ configurations as well. It is noted that a first element may be "operatively coupled" to another without the opposite being true.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can.

As used herein, a "product side" means the side of a construct used in a container that contacts, or could contact, a product such as, but not limited to, a food or beverage. That is, the "product side" of the construct is the side of the construct that, eventually, defines the interior of a container.

As used herein, a "customer side" means the side of a construct used in a container that does not contact, or could not contact, a product such as, but not limited to, a food or beverage. That is, the "customer side" of the construct is the side of the construct that, eventually, defines the exterior of a container.

As used herein, "generally curvilinear" includes elements having multiple curved portions, combinations of curved portions and planar portions, and a plurality of planar portions or segments disposed at angles relative to each other thereby forming a curve.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

As used herein, a bubble with an "enhanced coined periphery" means that the coined area extending about the periphery of the bubble is between about 70% and 95% of the total bubble surface area. As used herein, a "beverage can enhanced coined periphery" means that the coined area extending about the periphery of the bubble is about 77.2% of the total bubble surface area. Further, as used herein, an "expanded coined periphery" means that the coined area extending about the periphery of the bubble is between 75% and 90% of the total bubble surface area. As used herein, and alternatively, a "beverage can expanded coined periphery" also means that the coined area extending about the periphery of the bubble is about 77.2% of the total bubble surface area.

As used herein, an "expandable bubble" means that a bubble has multiple optimized dimensions structured to allow a resulting rivet to have a greater overlap when staked. That is, the combined result of the multiple optimized dimensions allow the resulting rivet to have a greater overlap when staked. A bubble that has a single optimized dimension cannot be an "expandable bubble."

The following description provides for forming an expandable bubble 12 on a blank 10 or a shell 20. As shown in FIGS. 2-5, the blank 10 (FIG. 5) is formed into a shell 20 and then into a can end 30. It is understood, and as described below, there are other stages during the formation of the can end 30 beyond the three stages shown in FIGS. 2-4. As the blank 10 is formed into a can end 30, the expandable bubble 12 is formed into an expandable rivet button 22 and then, when the expandable rivet button 22 is staked, (thereby coupling a tab to the shell 20) an expanded rivet 32.

The following discussion and the Figures use a generally cylindrical can end 30, FIG. 2, as an example. It is understood that the disclosed and claimed concept is operable with can ends 30 of any shape and the cylindrical shape discussed and shown is exemplary only. Further, in an exemplary embodiment and for the dimensions described below, the can end 30 is made from aluminum or aluminum alloys and is structured to be coupled to a beverage can; that is, a can structured to contain a beverage such as beer or carbonated beverages, i.e., a "soda" or "pop." As used herein, such can end 30 is identified as a "beverage container can end" 30'. Similarly, the shell that becomes a "beverage container can end" 30' is, as used herein, a "beverage can shell" 20'. One non-limiting example of a beverage can having a beverage container can end 30' is a twelve ounce beverage can 30. It is understood, however, that the concept disclosed below is also applicable to can ends made of other materials such as, but not limited to, steel and steel alloys. It is further understood that steel cans and can ends are typically made from material with a base thickness thinner than aluminum can ends. Thus, a steel can end that includes the down-gauging concept disclosed herein would have a thinner base thickness than the dimensions for an aluminum can, as described below, and a thinner base thickness than the metal used to make the can ends that do not include the down-gauging concept disclosed herein.

Figure 9A:
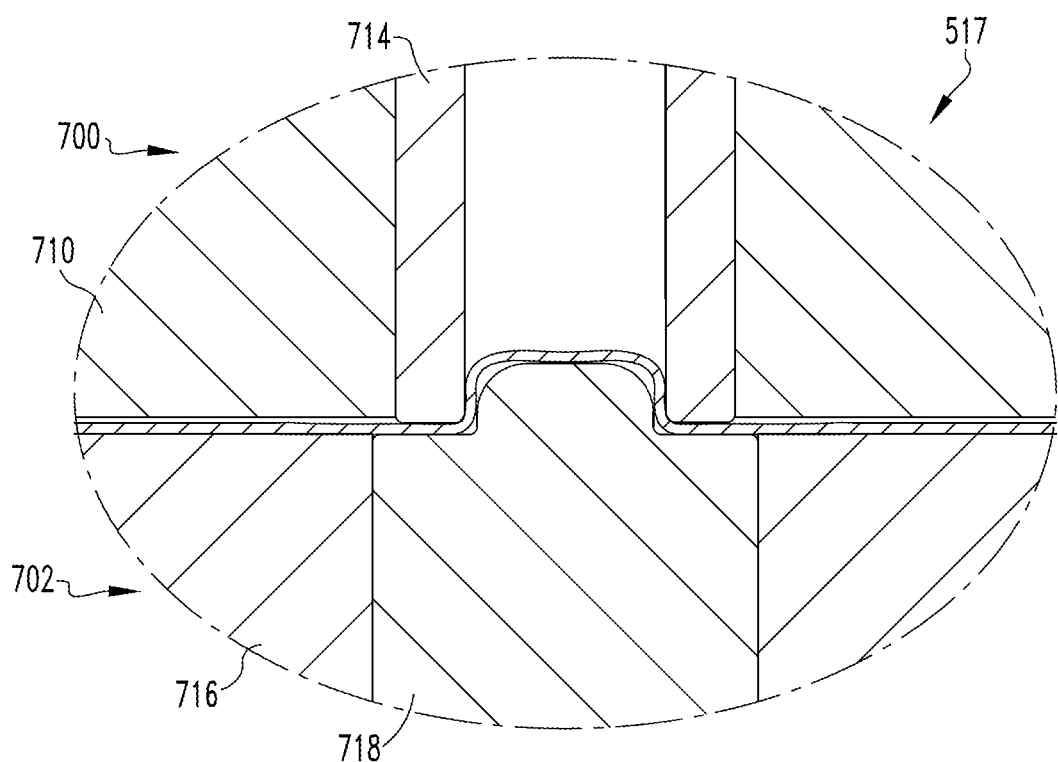
FIG. 9A is a detail, schematic cross-sectional view of a third rivet station.
Figure 9B:
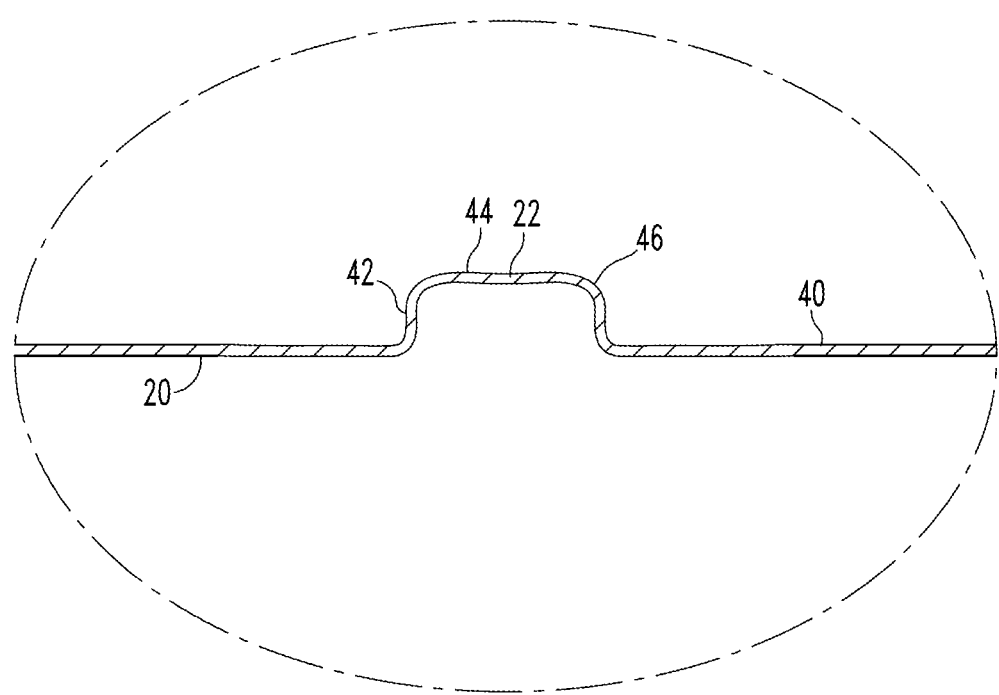
FIG. 9B is a detail, schematic cross-sectional view of an expandable rivet button on a shell.

As is generally known, a can end 30 is structured to be, and is, coupled, directly coupled, or fixed in a sealed manner to a can body (not shown) to form a container (not shown). The can end 30 includes a generally planar central panel 40, discussed below, and the expanded rivet 32, as defined below. The expanded rivet 32 is formed from an expandable rivet button 22 (FIG. 9B). That is, an expandable rivet button 22 protrudes upwardly, as shown, from the central panel 40 and includes a sidewall 42 and a generally planar top portion 44. The terms sidewall 42 and top portion 44 describe the same elements of both the expanded rivet 32 and the expandable rivet button 22 and the same names/reference numbers are used to describe these common elements. Further, while the expandable bubble 12 does not include a perpendicular sidewall and planar top portion, it is understood that portions of the expandable bubble 12 substantially become the rivet sidewall 42 and top portion 44 with a transition portion 46 therebetween. The rivet transition portion 46 has a radius of about 0.014 inch, when viewed in cross-section, as shown. That is, the expandable bubble 12 includes a perimeter 41 and a rivet portion 43. Further, as described below, the perimeter 41, which is substantially the area extending about, i.e., around, the rivet portion 43, is one of either an enhanced coined periphery 16 or an expanded coined periphery 18, as defined above. The rivet portion 43 is formed into the expandable rivet button sidewall 42 and top portion 44, as described below.

Further, the central panel 40 disposed about the expanded rivet 32 generally exists in both the blank 10 and the shell 20 and, therefore, is identified as the central panel 40 at all stages of forming the can end 30. Generally, the central panel 40 is planar but may include formations such as, but not limited to, a recess disposed about a tab 50. In an exemplary embodiment, the central panel 40 is made from aluminum and is sized for a beverage container. As used herein, "sized for a beverage container" means sized for a twelve fluid ounce beverage container of a standard size used for "soda," "pop," or beer, which is well known in the art.

A shell 20 is converted to a can end 30 when a tab 50 is coupled thereto. The tab 50 includes an elongated body 52 defining an opening 54. The tab body opening 54 is disposed about an expandable rivet button 22, i.e., the expandable rivet button 22 extends through the tab body opening 54. Then the expandable rivet button 22 is deformed, i.e., generally flattened, thereby forming the expanded rivet 32. The deformation of the expandable rivet button 22 increases the radius/diameter of the expanded rivet 32 so that the expanded rivet 32 has an "enhanced overlap" of a tab body 52. Generally, the deformation of the expandable rivet button 22 deforms the expandable rivet button sidewall 42 causing the expandable rivet button sidewall 42 to buckle outwardly. Further, as used herein, an expanded rivet 32 inherently has a deformed sidewall 42. That is, the expanded rivet deformed sidewall 42 is the expandable rivet button sidewall 42 after deformation. Accordingly, the expanded rivet deformed sidewall 42 and the expandable rivet button sidewall 42 share the same reference number.

In an exemplary embodiment, the can end 30 is formed from a sheet material 1 (also identified herein as a "sheet" 1) having a base thickness that is less than 0.0082 inch. In an exemplary embodiment, the material 1 is aluminum or an aluminum alloy, as used herein, is an "aluminum sheet material" 1. When identified as an "aluminum sheet material" 1, the sheet material 1 excludes other materials including, but not limited to, steel and steel alloys. Use of such a sheet material 1 solves the problems stated above. Further, for a beverage container can end 30', the sheet material 1 is aluminum, or an aluminum alloy, having a base thickness of between about 0.0080 inch and about 0.0060 inch, or about 0.0078 inch. Use of a sheet material 1 with such a base thickness solves the problems stated above. The base thickness of the sheet material 1 is also the base thickness of any unformed portions of the central panel 40. Stated alternately, the central panel 40 has a base thickness that generally corresponds to the base thickness of the sheet material 1. As used herein, the "thickness" is measured along a line substantially normal to the surface of the sheet material 1, the blank 10, unformed portions of the shell 20, or unformed portions of the can end 30.

As the blank 10 is formed into a can end 30, an expandable bubble 12 shown in FIG. 2 is formed. That is, a shell 20 (or the sheet material 1 or the blank 10) includes a bubble portion 28 which is the portion of the central panel 40 that will be formed into an expandable bubble 12. The expandable bubble 12 includes a head 14 and a periphery 15 disposed thereabout. Initially, it is noted that a prior art bubble head for a beverage container can end generally had a thickness of about 0.00725 inch. As discussed below, the press 500 used to form a can end 30 includes a bubble station upper punch 602 and a generally opposing bubble station lower punch 606. The forming surface of the bubble station upper punch, i.e., the first bubble coining surface 624 (discussed below) is generally torpid, i.e., ring shaped. Thus, during the forming process, a portion of the expandable bubble 12 is not disposed between two forming surfaces. The portion of the expandable bubble 12 that is not disposed between two forming surfaces is the bubble head 14. Generally, the bubble head 14 is subsequently formed into the rivet portion 43. In an exemplary embodiment, the bubble head 14 has a thickness of between about 0.0073 inch and 0.0079 inch, or, about 0.0076 inch. That is, in an exemplary embodiment, during the forming process metal is drawn out of, the bubble head 14, as described below.

Further, as described below, during the formation of the expandable bubble 12, the portion of the shell 20 disposed between the bubble station upper punch 602, i.e., the bubble station upper punch body 603, and the opposing bubble station lower punch 606, i.e., the bubble station lower punch body 607, is coined. As used herein, to "coin" means to simultaneously engage opposing sides of the shell 20 and induce plastic flow on the surface of the material. As is known, coining material work hardens the surface(s), while the material therebetween retains its toughness and ductility. The portion of the expandable bubble 12 disposed about, i.e., around, the periphery 15, and in an exemplary embodiment, the portion immediately about the rivet portion 43, is coined and is one of either an enhanced coined periphery 16 or an expanded coined periphery 18. That is, the perimeter 41 is formed as one of either an enhanced coined periphery 16 or an expanded coined periphery 18. In an exemplary embodiment, when the can end 30 is a beverage container can end 30', the enhanced coined periphery 16 is a beverage can enhanced coined periphery 16', or, the expanded coined periphery 18 is a beverage can expanded coined periphery 18'.

As shown in the Figures, the bubble head 14 has a first curvature, when viewed in cross-section, and the enhanced coined periphery 16 or the expanded coined periphery 18 has a second curvature, when viewed in cross-section. Further, the expandable bubble 12 has a height. The expandable bubble 12 height is measured from the lower, or product side, of the shell 20 and/or central panel 40. In an exemplary embodiment, the expandable bubble 12 height is between about 0.0840 inch and about 0.0880 inch. When the can end 30 is a beverage container can end 30', the expandable bubble 12 height is about 0.0859 inch.

An expandable bubble 12 with such a bubble head 14 solves the problems stated above. That is, in this exemplary embodiment, the "multiple optimized dimensions" that allow the bubble to be identified as an "expandable bubble" are the thickness of the bubble head 14 and the enhanced coined periphery 16 or the expanded coined periphery 18. In another exemplary embodiment, the height of the expandable bubble 12 is another dimension that is optimized and the height of the expandable bubble 12 along with the thickness of the bubble head 14 and/or the enhanced coined periphery 16/the expanded coined periphery 18, are the "multiple optimized dimensions" that allow the bubble to be identified as an "expandable bubble" 12. An expandable bubble 12 is structured to be formed into an expandable rivet button 22 and then into an expanded rivet 32. Use of an expanded rivet 32 allows for the use of sheet material 1 with a base thickness of less than 0.0082 inch and, in an exemplary embodiment, a sheet material 1 with a base thickness of about 0.0078 inch. This solves the problems stated above.

As noted above, the shell 20 is, initially, a blank 10 cut from a sheet 1 of generally planar material such as, but not limited to aluminum, steel, or alloys of either. That is, in an exemplary embodiment, the sheet 1 of generally planar material (hereinafter, "sheet material" 1) is provided to a press 500, shown schematically FIG. 5, such as a conversion press, that is structured to, and does, form the sheet material 1 into a can end 30 (FIG. 4). Alternatively, the sheet material 1 is only formed into a shell 20 in a shell press (not shown).

Figure 10A:
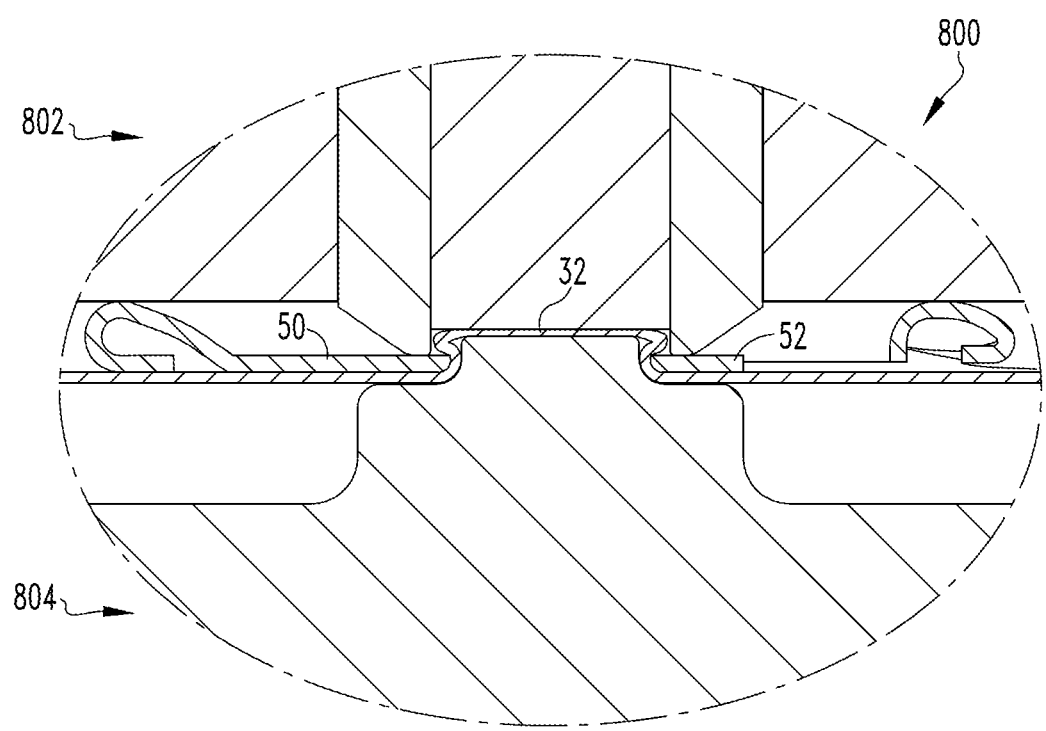
FIG. 10A is a detail, schematic cross-sectional view of a staking station.

As shown in FIG. 5, the press 500 includes a number of stations 502 (some shown schematically) each of which perform a number of forming operations on the shell 20 (as shown in the Figures, stations are generically identified by reference number 502). For the purpose of this application, the following stations 502 are identified: a bubble station 512 (FIG. 6A), a first rivet station 514 (FIG. 7A), a second rivet station 516 (FIG. 8A), a third rivet station 517 (FIG. 9A) and a stake station 518 (FIG. 10A). One of the first forming operations includes cutting the blank 10 from the sheet material 1; thus, there is a blanking station, not shown. As is known, other forming operations form the blank 10 so as to have a countersink, a chuck wall and other elements of a shell 20. It is understood, however, that the expandable bubble 12 can be formed at any time prior to forming a rivet, including before the blank 10 is cut from the sheet material 1. Thus, the forming operations that form the expandable bubble 12 can be performed on any of the sheet material 1, the blank 10, or the shell 20. Generally, the discussion below will use the shell 20 as a non-limiting example of a work piece being formed.

The blank 10/shell 20 moves through the conversion press 500 on a conveyor 504, shown schematically in FIG. 5, that is structured to, and does, move with an intermittent, or indexed, motion. In an exemplary embodiment, the conveyor 504 is a belt 506 (shown schematically) including a number of recesses, not shown. The belt 506 moves a set distance then stops before moving the set distance again. As the belt 506 moves, a blank 10/shell 20 is moved sequentially through the conversion press number of stations 502 where, as noted above, each station 502 performs a single forming operation, or a number of forming operations, on the blank 10/shell 20.

The conversion press 500, or stated alternately each station 502 thereof, includes an upper tooling assembly 550 and a lower tooling assembly 552. Each of the upper tooling assembly 550 and a lower tooling assembly 552 for multiple stations 502 are, in an exemplary embodiment, unitary or coupled and support the dies, punches and other elements of each station. In this configuration, the upper tooling assemblies 550 for the stations move at the same time and are driven by a single drive assembly (not shown). For the purpose of identifying specific components, elements of a tooling assembly are also identified as parts of a specific station 502. That is, for example, the upper tooling assembly 550 at the bubble station 512, discussed below, is also identified as the bubble station upper tooling assembly 560. It is understood that any specifically identified upper tooling assembly 550 or lower tooling assembly 552, e.g., a "rivet station upper tooling assembly 700," are generally part of the upper/lower tooling assemblies 550/552, respectively, and the identifier/name merely indicates the nature of the station.

The conversion press 500 further includes a frame 554 and a drive assembly, not shown. In an exemplary embodiment, the lower tooling assembly 552 is fixed to the frame 554 and is substantially stationary. The upper tooling assembly 550 is movably coupled to the frame 554 and is structured to move between a first position, wherein the upper tooling assembly 550 is spaced from the lower tooling assembly 552, and a second position, wherein the upper tooling assembly 550 is closer to, and in an exemplary embodiment, immediately adjacent, the lower tooling assembly 552. The lower tooling assembly 552 is, in an exemplary embodiment, coupled, directly coupled, or fixed to the frame 554.

It is understood that, generally, the belt 506 moves when the upper tooling assembly 550 is in (or moving toward or away from) the first position. Conversely, the belt 506 is stationary when the upper tooling assembly 550 is in the second position. As is known, the drive assembly is structured to, and does, move the upper tooling assembly 550 between the first and second positions. Further, and as is known, the upper tooling assembly 550 and the lower tooling assembly 552 include separately movable elements, e.g., punches, dies, spacers, pads, risers and other sub-elements (collectively hereinafter "sub-elements"), that are structured to, and do, move separately from each other. All elements, however, generally move with the upper tooling assembly 550 between first and second positions. That is, generally, the motions of the sub-elements are relative to each other but as a whole, the upper tooling assembly 550 moves between the first position and the second position as described above. Further, it is understood that the drive assembly includes cams, linkages, and other elements that are structured to move the sub-elements of the upper tooling assembly 550 and the lower tooling assembly 552 in the proper order. That is, selected sub-elements of the upper tooling assembly 550 and the lower tooling assembly 552 are structured to move independently of other selected sub-elements. For example, one selected sub-element is structured to move into, and dwell, at the second position while another sub-element moves into and out of the second position. Such selective motion of the sub-elements is known in the art.

In an exemplary embodiment, the bubble station 512 includes a bubble station upper tooling assembly 560 and a bubble station lower tooling assembly 562. The bubble station upper tooling assembly 560 includes an upper cap 600 and an upper punch 602. The bubble station lower tooling assembly 562 includes a lower cap 604 and a lower punch 606. The bubble station upper cap 600 and the bubble station upper punch 602 are coupled, directly coupled, or fixed to a bubble station upper tooling assembly 550. The bubble station lower cap 604 and the bubble station lower punch 606 are coupled, directly coupled, or fixed to a bubble station lower tooling assembly 552. In an exemplary embodiment, the bubble station upper cap 600 and the bubble station lower cap 604 are structured to move together prior to the bubble station upper punch 602 and the bubble station lower punch 606 engaging the shell 20. That is, the bubble station upper cap 600 and the bubble station lower cap 604 move together and hold, or clamp, the shell at the central panel 40. As used herein, to "hold" an element being formed means that the material being held is drawn or ironed, i.e., the metal flows, between the constructs "holding" the element. The act of drawing/ironing the material may thin the material. As used herein, to "clamp" an element being formed means that the material being clamped is substantially fixed between the constructs "clamping" the element. Thus, when a formation that increases the surface area of the element being formed occurs on a clamped element, the material is stretched and thinned as opposed to being drawn and thinned. In one exemplary embodiment, the bubble station upper cap 600 and the bubble station lower cap 604 are structured to, and do, hold the sheet material 1/the blank 10/the shell 20. In another exemplary embodiment, the bubble station upper cap 600 and the bubble station lower cap 604 are structured to, and do, clamp the sheet material 1/the blank 10/the shell 20. After the bubble station upper cap 600 and the bubble station lower cap 604 move together, the bubble station lower punch 606 engages the shell forming an initial bubble. Thereafter, or at about the same time, the bubble station upper punch 602 moves to a coining distance from the bubble station lower punch 606. As used herein, a "coining distance" is a distance between two surfaces sufficiently close so as to coin material disposed between the two surfaces.

That is, the bubble station upper punch 602 includes a body 603 with an upper end 620 and a lower end 622. As shown, the bubble station upper punch body 603 is a hollow, generally cylindrical body. The bubble station upper punch body lower end 622 defines a first bubble coining surface 624. As used herein, a "coining surface" means a surface structured to coin a metal. Stated alternately, a coining surface 624 is disposed on the bubble station upper punch body lower end 622. The bubble station lower punch 606 also includes a body 607 with an upper end 630 and a lower end 632. The bubble station lower punch body upper end 630 defines a second bubble coining surface 634. That is, the portion of the bubble station lower punch body upper end 630 that is disposed in opposition to the first bubble coining surface 624 is the second bubble coining surface 634.

In operation, the first bubble coining surface 624 is structured to move between a first position, wherein the first bubble coining surface 624 is spaced from the second bubble coining surface 634, and a second position, wherein the first bubble coining surface 624 is a coining distance from the second bubble coining surface 634. Thus, the first bubble coining surface 624 and the second bubble coining surface 634 are structured to engage the bubble portion 28 of a sheet material 1 disposed between the first bubble coining surface 624 and the second bubble coining surface 634. In this configuration, when the first bubble coining surface 624 and the second bubble coining surface 634 are in the second position, the first bubble coining surface 624 and the second coining bubble surface 634 form an expandable bubble, as described above. That is, the bubble station upper tooling assembly 560, or the bubble station upper punch 602, is structured to move between a first position, wherein the bubble station upper tooling assembly 560 is spaced from the bubble station lower tooling assembly 562 (and elements thereof including, but not limited to, the bubble station lower punch 606), and a second position wherein the bubble station upper tooling assembly 560 is immediately adjacent the bubble station lower tooling assembly 562 (and elements thereof including, but not limited to, the bubble station lower punch 606).

Figure 6A:
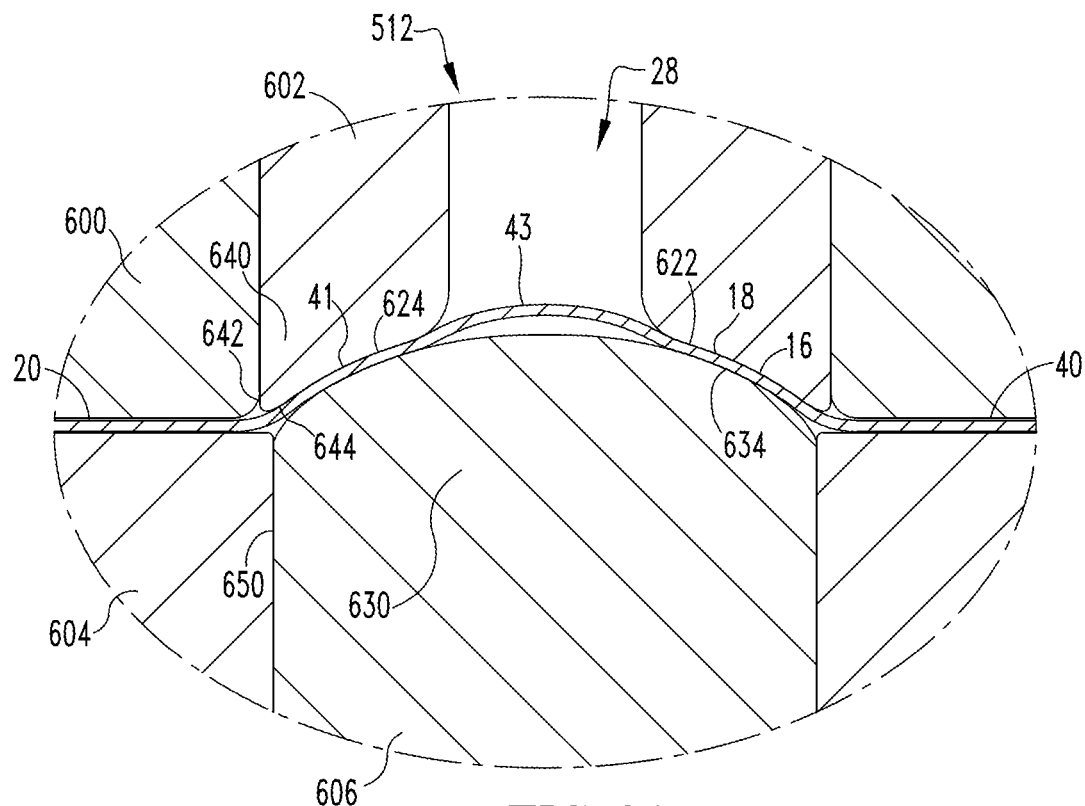
FIG. 6A is a detail, schematic cross-sectional view of a bubble station.
Figure 6B:
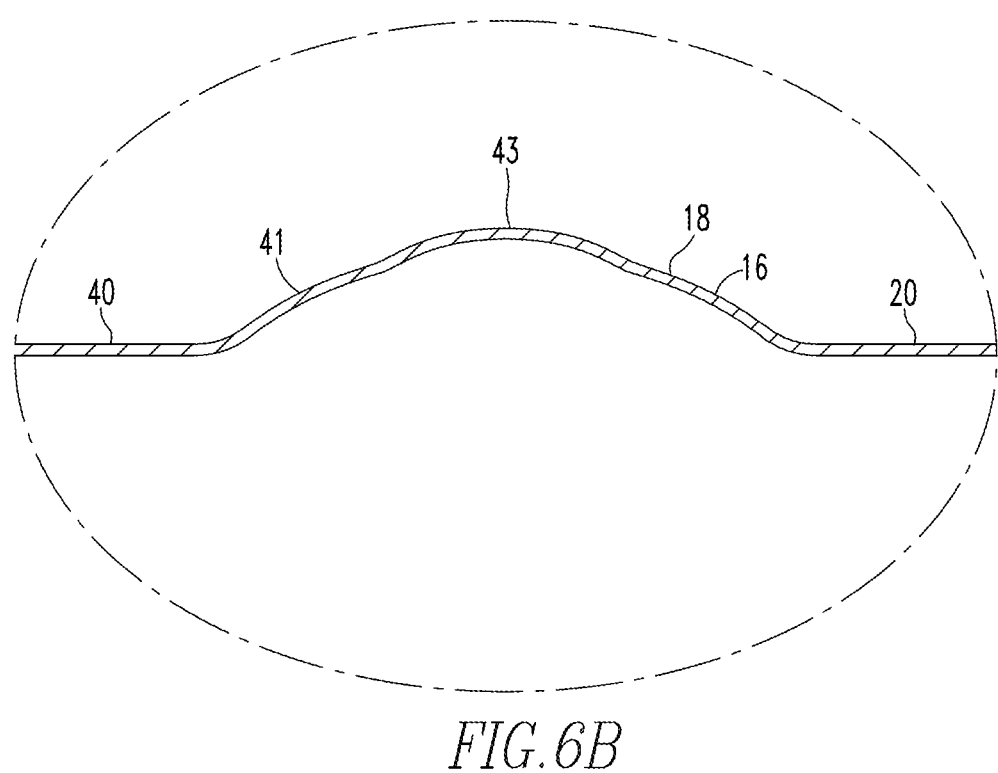
FIG. 6B is a detail, schematic cross-sectional view of an expandable bubble on a shell.
Figure 7A:
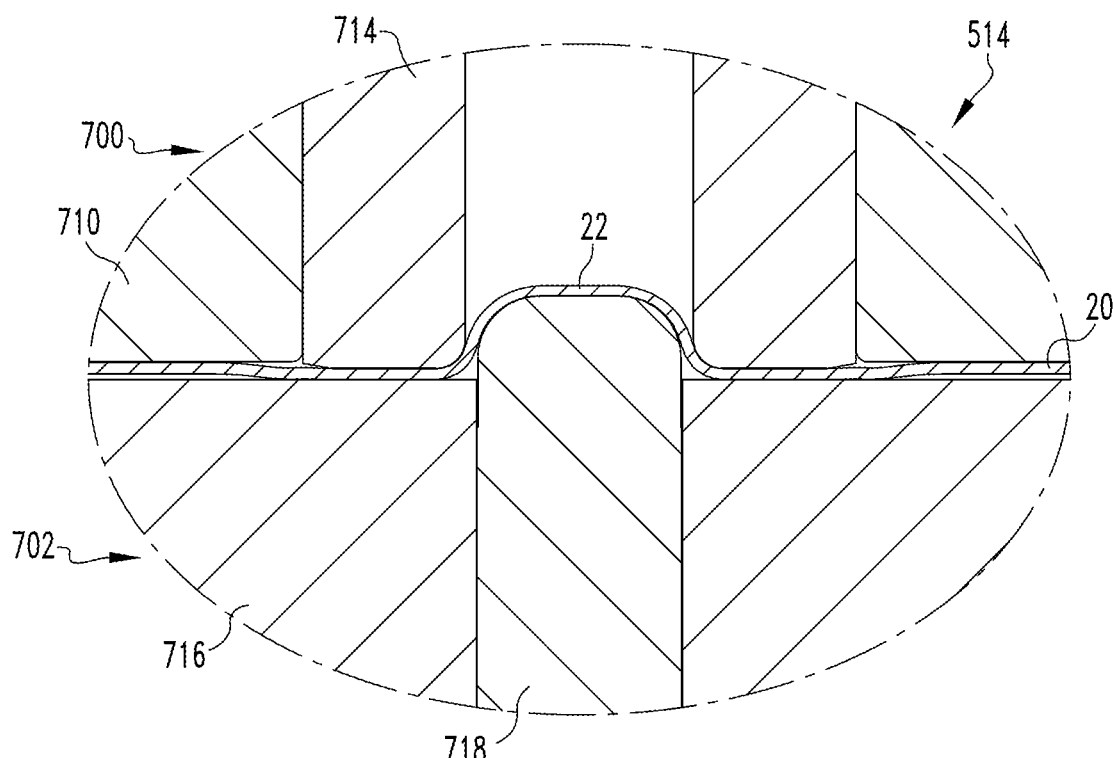
FIG. 7A is a detail, schematic cross-sectional view of a first rivet station.
Figure 7B:
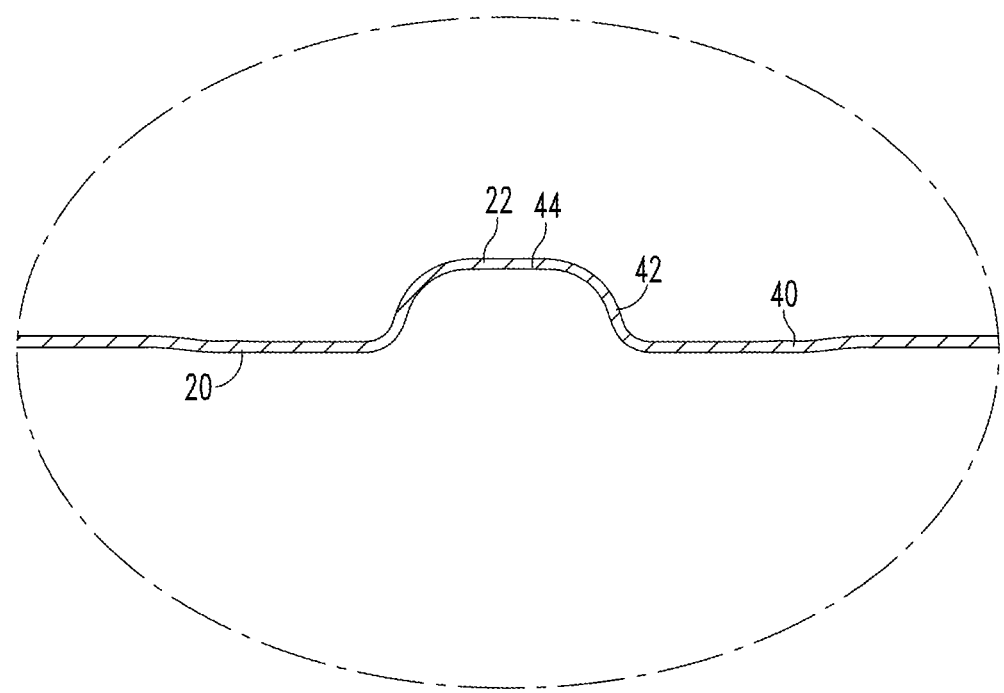
FIG. 7B is a detail, schematic cross-sectional view of an expandable rivet button on a shell.

In an exemplary embodiment, the bubble station upper punch body lower end 622 includes a rounded peripheral portion 640. The bubble station upper punch body lower end peripheral portion 640, when viewed in cross-section as shown in FIG. 6A, includes an outer end 642 and an inner end 644. The bubble station upper punch body lower end peripheral portion inner end 644 has a radius. Again, it is noted that in an exemplary embodiment, the can end 30 is generally circular and therefore the tooling is also generally circular. It is understood that the bubble station upper punch body lower end peripheral portion inner end 644 "radius" is measured from the center of a generally circular bubble station upper punch body lower end 622. It is further understood that if the bubble station upper punch body lower end 622 was not circular, the "radius" would be measured as a corresponding cross-sectional line. That is, for example, if the bubble station upper punch body lower end 622 was generally rectangular, the "radius" would be one half of a line extending laterally over the rectangular upper punch body lower end 622.

The bubble station lower tooling assembly lower cap 604 includes an inner radial surface 650. The bubble station lower tooling assembly lower cap inner radial surface 650 has a radius. The bubble station upper punch body lower end peripheral portion inner end 644 radius is greater than the bubble station lower tooling assembly lower cap inner radial surface 650 radius.

Further, and in an exemplary embodiment, the bubble station upper punch 602 and the bubble station lower punch 606 have an "expandable bubble contour." That is, as used herein, an "expandable bubble contour" means that, collectively, the bubble station upper punch 602 and the bubble station lower punch 606 have a total coining surface area of between about 0.085 in.$^2$ and 0.102 in.$^2$, and a "beverage can expandable bubble contour" has a total coining surface area is about 0.0905 in.$^2$ Further, in an exemplary embodiment, the bubble station upper punch 602 and the bubble station lower punch 606 have the characteristics identified in the right column of the table below and as shown in FIG. 1. It is understood that all measurements in the table below, and the ratios discussed below, are approximations. That is, any of these numbers are read as if preceded by the term "about" as defined above.

| Element Characteristic | Reference Ltr. | Prior Art | Expandable Bubble |
|---|---|---|---|
| Bubble station upper punch diameter | A | 0.3585 in. | 0.3700 in. |
| Bubble station lower punch diameter | B | 0.3520 in. | 0.3520 in. |
| Bubble station lower punch height | C | 0.0654 in. | 0.0689 in. |
| Coining surface length | D | 0.1015 in. | 0.1165 in. |
| Total coining surface area | | 0.0768 in.$^2$ | 0.0905 in.$^2$ |

Figure 11:
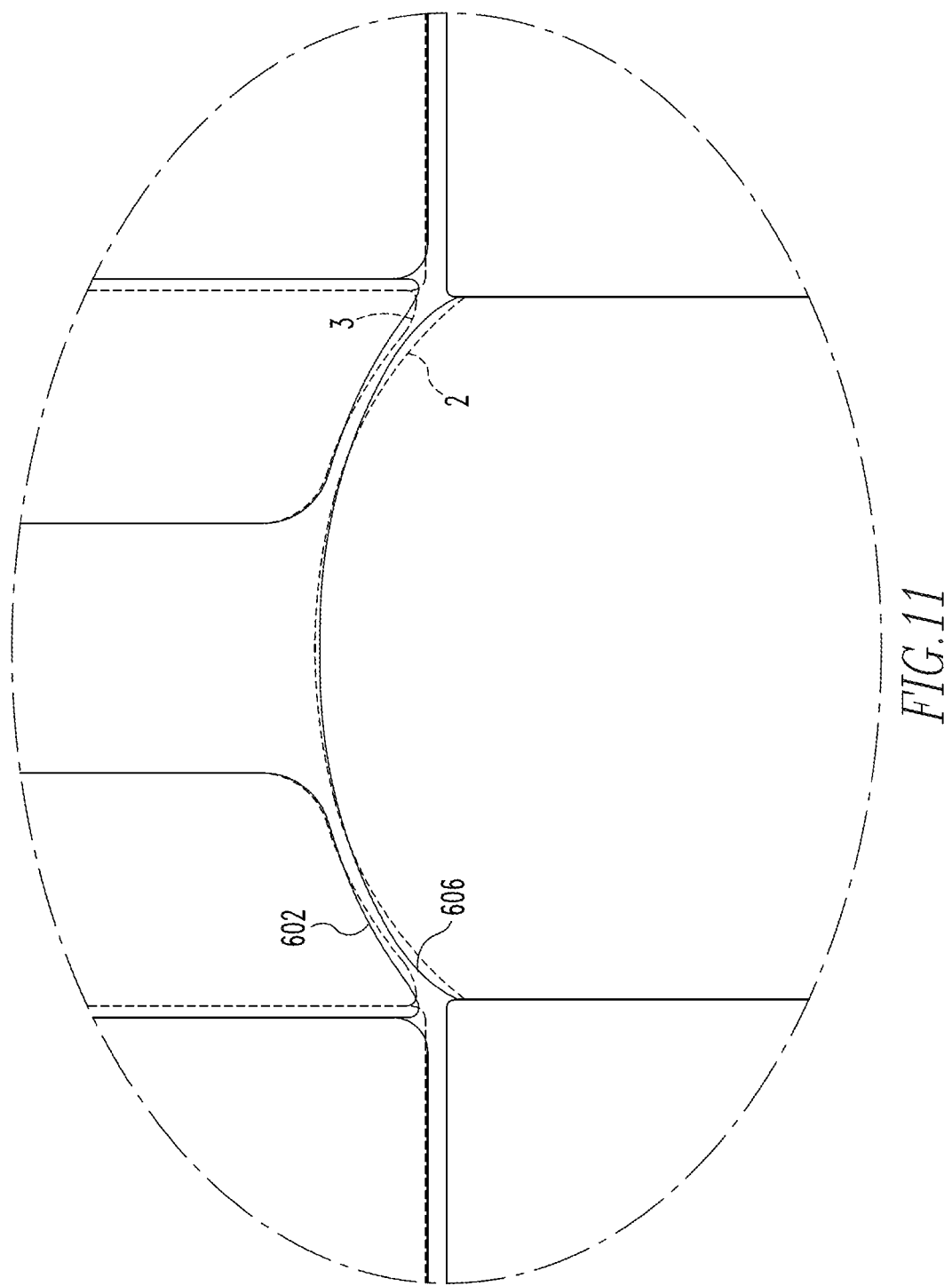
FIG. 11 is a detail, schematic cross-sectional view of a prior art bubble station compared to the disclosed bubble station.

Further, in an exemplary embodiment, the press 500 has a bubble station lower punch 606 diameter/height ratio of between about 5.0:1 to about 8.0:1, or, a diameter/height ratio of between about 5.0:1 to about 5.3:1, or, about 5.11:1, and, a rivet station upper punch coining surface length/diameter ratio of between about 0.3:1 to 0.6:1, or about 0.315:1. Further, in an exemplary embodiment, the press 500, i.e., the bubble station upper punch 602 and the bubble station lower punch 606 have a bubble station upper punch coining surface length/diameter ratio of about 0.315:1 and a bubble station lower punch diameter/height ratio of about 5.11:1. It is noted that, generally, when the sheet material 1 is thinner (relative to a different sheet material 1) the bubble station upper punch diameter (A) and the coining surface length (D) are increased. FIG. 11 shows a comparison of a prior art bubble station and a bubble station 512 structured to form an expandable bubble 22.

Thus, as used herein, a "standard beverage can press" has a bubble station lower punch diameter/height ratio of 5.38:1 and a bubble station upper punch coining surface length/diameter ratio of 0.283:1. Such tooling forms, as used herein, a "standard bubble." A bubble station 512, i.e., a bubble station upper punch 602 and a bubble station lower punch 606, having an "expandable bubble contour," as defined above, has a contour that is different than a "standard bubble" and is, as used herein, a "non-standard bubble." Further, in an exemplary embodiment, the bubble station upper tooling assembly 560 and the bubble station lower tooling assembly 562, or the bubble station upper punch 602 and the bubble station lower punch 606, are structured to operate together to form an expandable bubble 12 as defined above. That is, the bubble station upper tooling assembly 560 and the bubble station lower tooling assembly 562, or the bubble station upper punch 602 and the bubble station lower punch 606, are structured to form an expandable bubble 12 with a bubble head 14 wherein the bubble head 14 has a thickness of between about 0.0073 inch and 0.0079 inch, or about 0.0076 inch. Further, the bubble station upper tooling assembly 560 and the bubble station lower tooling assembly 562, or the bubble station upper punch 602 and the bubble station lower punch 606, are structured to form an expandable bubble 12 with a height of between about 0.0840 inch and about 0.0880 inch, or about 0.0859 inch.

Tooling in this configuration is structured to form an expandable bubble 12 and, as such, solves the problems noted above.

Figure 12:
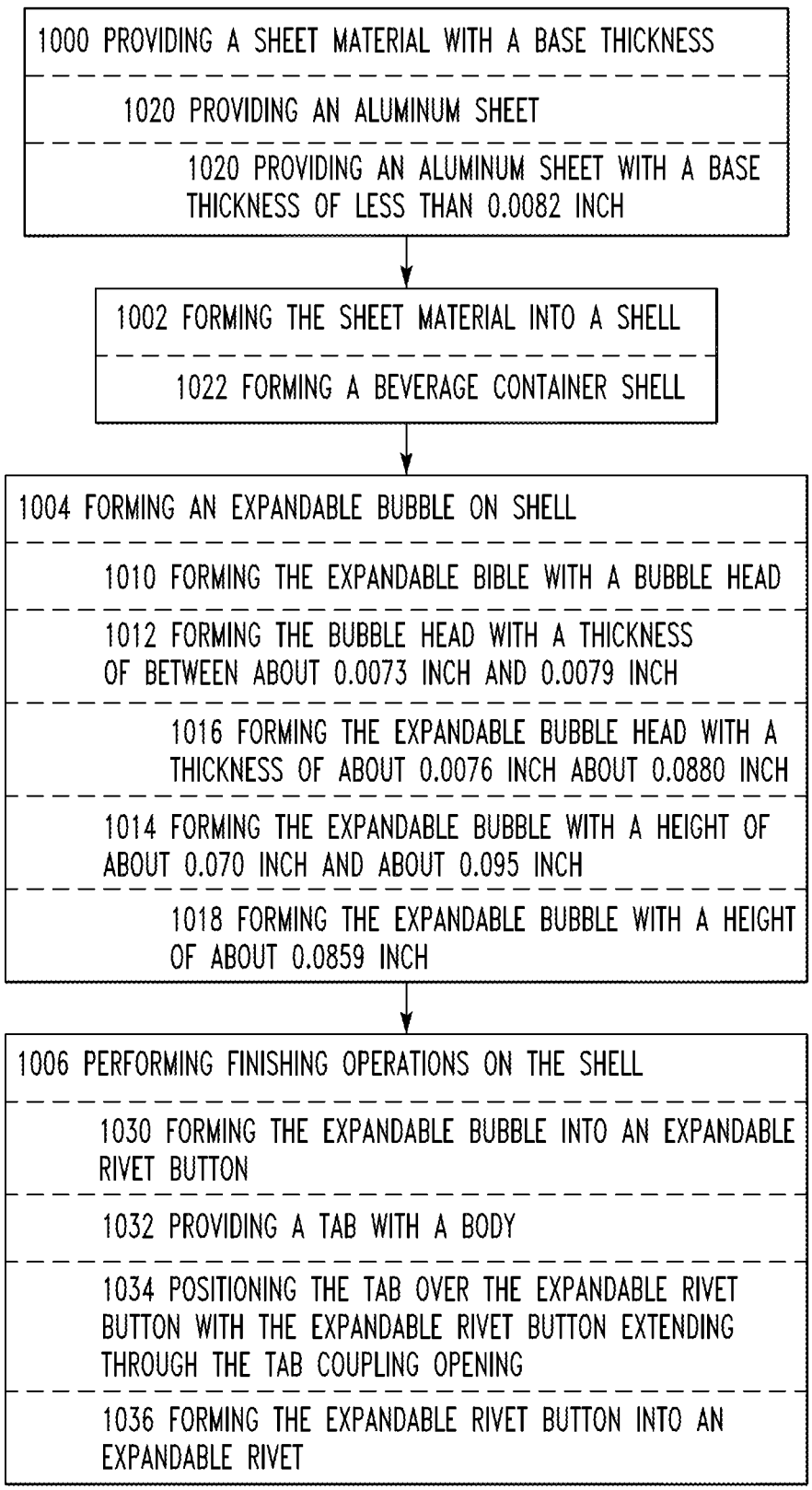
FIG. 12 is a flow chart of a disclosed method.

Accordingly, as shown in FIG. 12, a method of forming a shell 20 with an expandable bubble 12 includes, providing 1000 a sheet material 1 with a base thickness, forming 1002 the sheet material into a shell 20, forming 1004 an expandable bubble 12 on the shell 20, and performing 1006 finishing operations on the shell 20. As used herein, "finishing operations" include, but are not limited to, scoring the shell 20 or can end 30, paneling the shell 20 or can end 30, inspection of the shell 20 or can end 30, or applying coatings and/or other surface treatments to the shell 20 or can end 30.

In an exemplary embodiment, forming 1004 an expandable bubble 12 on the shell 20 includes forming 1010 the expandable bubble 12 with a bubble head 14, forming 1012 the bubble head 14 with a thickness of between about 0.0073 inch and 0.0079 inch, and forming 1014 the expandable bubble with a height of between about 0.070 inch and about 0.095 inch. Alternately/additionally, forming 1004 an expandable bubble 12 on the shell 20 includes forming 1016 the expandable bubble head with a thickness of about 0.0076 inch and forming 1018 the expandable bubble with a height of about 0.0859 inch.

In an exemplary embodiment, providing 1000 a sheet material 1 with a base thickness and forming 1002 the sheet material into a shell 20, forming 1004 an expandable bubble 12 on the shell 20 further include providing 1020 an aluminum sheet 1', and, forming 1022 a beverage container shell 20. In an exemplary embodiment, the providing 1020 an aluminum sheet includes providing 1021 an aluminum sheet 1' with a base thickness of less than 0.0082 inch. As noted above, in an exemplary embodiment, the base thickness of the aluminum sheet 1' is between about 0.0080 inch and about 0.0060 inch, or about 0.0078 inch. Further, performing 1006 finishing operations on the shell 20 includes forming 1030 the expandable bubble into an expandable rivet button, providing 1032 a tab with a body, the tab body including a coupling opening, positioning 1034 the tab over the expandable rivet button with the expandable rivet button extending through the tab coupling opening, forming 1036 the expandable rivet button into an expandable rivet, and wherein the expandable rivet has an enhanced overlap of the tab body. As used herein, an "enhanced overlap" of a tab body 52 means that the deformed rivet sidewall 42 was formed from an expandable rivet button.

As noted above, the expandable bubble 12 is formed into an expandable rivet button 22, as shown in FIG. 9B. As such, the expandable rivet button 22 is disposed on the central panel 40 wherein the central panel 40 has the same base thickness as the sheet material 1 described above. When formed, as described below, the expandable rivet button 22 includes a generally planar top portion 44 and a generally cylindrical sidewall 42. As noted above, the rivet portion 43 is formed into the sidewall 42 and the top portion 44. As also noted above, the perimeter 41 is, substantially, either the enhanced coined periphery 16 or the expanded coined periphery 18. In an exemplary embodiment, the expandable rivet button top portion 44 has a thickness of between about 0.0050 inch and 0.0077 inch, or about 0.0075 inch. The expandable rivet button 22 has a height of between about 0.059 inch and about 0.039 inch, or about 0.054 inch. As used herein, the "height" of the expandable rivet button 22 is measured from the lower side of the central panel 40 to the upper side of the expandable rivet button top portion 44. That is, the "height" of the expandable rivet button 22 includes the height of the expandable rivet button sidewall 42 as well as the thickness of the expandable rivet button top portion 44. An expandable rivet button 22 with these characteristics solves the problems stated above. That is, an expandable rivet button 22 with these characteristics is structured to be, and is, formed into an expanded rivet 32 that has an enhanced overlap of a tab body 52, described below. Stated alternately, when the tab 50 is staked to the expandable rivet button 22, the expandable rivet button 22 becomes an expanded rivet 32 wherein expandable rivet 32 has an enhanced overlap of tab 50.

As shown in FIGS. 7A-9A, an expandable rivet button 22 (FIGS. 7B, 8B, 9B) is formed from the expandable bubble 12 in a number of rivet stations 514, 516, 517 in the conversion press 500, discussed above. Generally, each of a first, second, and third, rivet station 514, 516, 517, respectively, includes a rivet station upper tooling assembly 700 and a rivet station lower tooling assembly 702. Each rivet station upper tooling assembly 700 includes a rivet station upper cap 710 and a rivet station upper punch 714. Each rivet station lower tooling assembly 702 includes a rivet station lower cap 716 and a rivet station lower punch 718.

Generally, the first rivet station 514 forms the expandable bubble 12 into an expandable rivet button 21 having a sidewall 42 and a generally planar top portion 44. For the purpose of this disclosure, the details of the first rivet station 514 are not relevant other than to note that the expandable rivet button transition portion 46 has a greater radius than the rivet station lower punch body upper end transition surface 760, discussed below, and, that the first rivet station upper punch 714 does not extend above a reference plane 746 more than the distance discussed below.

In an exemplary embodiment, the second rivet station 516 forms the expandable bubble 12, and/or the rivet button 21, into the expandable rivet button 22. The second rivet station includes the rivet station upper tooling assembly 700 and the rivet station lower tooling assembly 702, as well as the rivet station upper cap 710, the rivet station upper punch 714, the rivet station lower cap 716 and the rivet station lower punch 718, as described above. The rivet station upper tooling assembly 700 is structured to, and does, move between a first position, wherein the rivet station upper tooling assembly 700 is spaced from the rivet station lower tooling assembly 702, and a second position, wherein the rivet station upper tooling assembly 700 is adjacent the rivet station lower tooling assembly 702. Further, when the rivet station upper tooling assembly 700 and the rivet station lower tooling assembly 702 are in the second position, the rivet station upper tooling assembly 700 and the rivet station lower tooling assembly 702 are structured to, and do, form an expandable rivet button 22.

In an exemplary embodiment, the rivet station upper punch 714 and the rivet station lower cap 716 are structured to, and do, move to the second position before the rivet station lower punch 718. In this configuration, the rivet station upper punch 714 and the rivet station lower cap 716 are structured to, and do, hold or clamp the shell 20, as defined above. After the shell is held/clamped, the rivet station lower punch 718 moves to the second position and forms the rivet button 21 into the expandable rivet button 22.

Figure 8A:
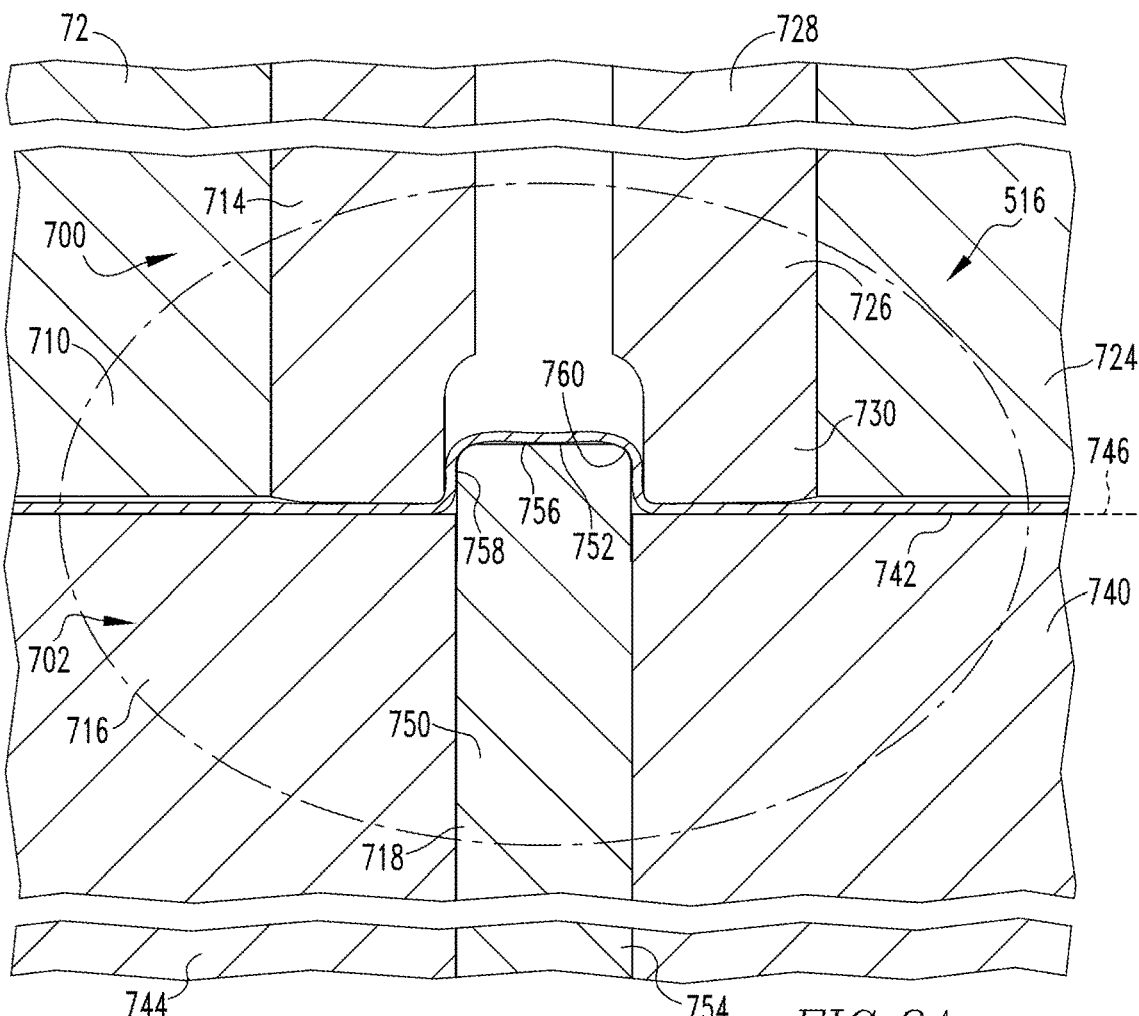
FIG. 8A is a detail, schematic cross-sectional view of a second rivet station.
Figure 8B:
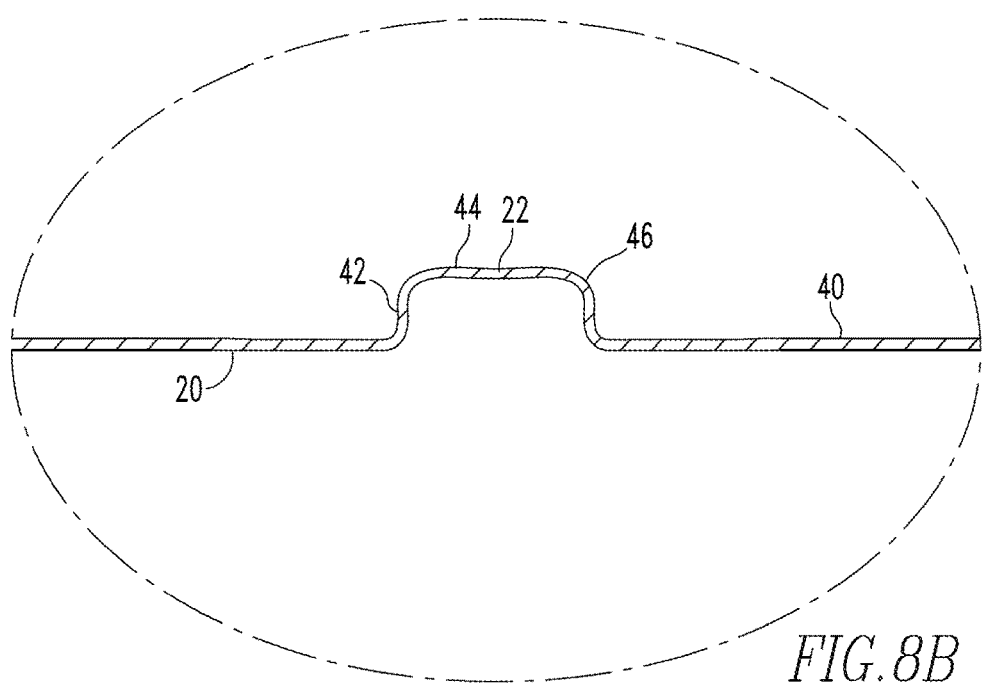
FIG. 8B is a detail, schematic cross-sectional view of an expandable rivet button on a shell.

In an exemplary embodiment, and as shown in FIG. 8A, the rivet station upper cap 710 includes a body 720 with an upper end 722 and a lower end 724. Further, the rivet station upper punch 714 includes a body 726 with an upper end 728 and a lower end 730. As shown, the rivet station upper punch body 726 is a hollow, generally cylindrical body. The rivet station lower cap 716 includes a body 740 with an upper end 742 and a lower end 744. The rivet station lower cap body upper end 742 is generally planar and defines a reference plane 746. That is, as used herein, the rivet station lower cap body upper end 742 is the "reference plane" 746 from which selected measurements, discussed below, are taken.

The rivet station lower punch 718 includes a generally cylindrical body 750 with an upper end 752 and a lower end 754. The rivet station lower punch body upper end 752 includes a generally planar top portion 756, a generally cylindrical radial surface 758 and a generally curvilinear transition surface 760 therebetween. That is, when viewed in cross-section, as in FIG. 8A, the rivet station lower punch body upper end transition surface 760 is generally curvilinear. As use herein, the rivet station lower punch body upper end transition surface 760 "radius" is measured as the curvature of rivet station lower punch body upper end transition surface 760 when viewed in cross-section. In an exemplary embodiment, and again when viewed in cross-section as shown, the rivet station lower punch body upper end transition surface 760 has a radius of between about 0.031 inch and about 0.005 inch, or a radius of about 0.014 inch. A rivet station lower punch 718 in this configuration solves the problems stated above.

In operation, the rivet station upper punch 714 is structured to, and does, move between a first position, wherein the rivet station upper punch 714 is spaced from the rivet station lower cap body upper end 742, and a second position, wherein the rivet station upper punch 714 is immediately adjacent the rivet station lower cap body upper end 742. When the rivet station upper punch 714 is in the second position, the rivet station upper punch 714 and the rivet station lower cap 716 hold or clamp the shell 20 as defined above. Further, in an exemplary embodiment, the rivet station lower punch body upper end 752 is structured to, and does, move between a first position, wherein the rivet station lower punch body upper end 752 is not offset an effective distance to the reference plane 746, and, a second position, wherein the rivet station lower punch body upper end 752 is offset an effective distance to the reference plane 746. As used herein, an "effective distance" is a distance sufficient for the rivet station lower punch 718 to form an expandable bubble 12 into expandable rivet button 22. In one exemplary embodiment, the "effective distance," i.e., the offset between the rivet station lower punch body upper end 752 and the reference plane 746, is between about 0.049 inch and about 0.030 inch from said reference plane, or, about 0.044 from said reference plane 746.

In this configuration, the rivet station upper tooling assembly 700 and the rivet station lower tooling assembly 702 are structured to, and do, form the expandable bubble 12, described above, so as to have an expandable rivet button top portion 44 with a thickness of between about 0.0073 inch and 0.0077 inch, or about 0.0075 inch. Further, the rivet station upper tooling assembly 700 and the rivet station lower tooling assembly 702 are structured to, and do, form the expandable bubble 12 so as to have a height of between about 0.059 inch and about 0.049 inch, or about 0.054 inch.

In an exemplary embodiment, and as shown in FIG. 10A, the number of stations 502 includes a staking station 800. As is known, a staking station 800 is structured to, and does, couple, directly couple, or fix a tab 50 to the shell 20. The staking station 800 includes a staking station upper tooling assembly 802 and a staking station lower tooling assembly 804. As is known, prior to the staking station 800, a tab 50 is disposed over the expandable rivet button 22 as described above. At the staking station 800, the staking station upper tooling assembly 802 is structured to, and does, move between a first position, wherein the staking station upper tooling assembly 802 is spaced from the staking station lower tooling assembly 804, and a second position, wherein the staking station upper tooling assembly 802 is adjacent, or immediately adjacent, the staking station lower tooling assembly 804. In this configuration, when the staking station upper tooling assembly 802 is in the second position, the staking station upper tooling assembly 802 and the staking station lower tooling assembly 804 are structured to, and do, form an expanded rivet 32 having an "enhanced overlap" of the tab body 52. This solves the problems above and allows for the use of a sheet material 1 with a base thickness that is less than 0.0082 inch.

Figure 10B:
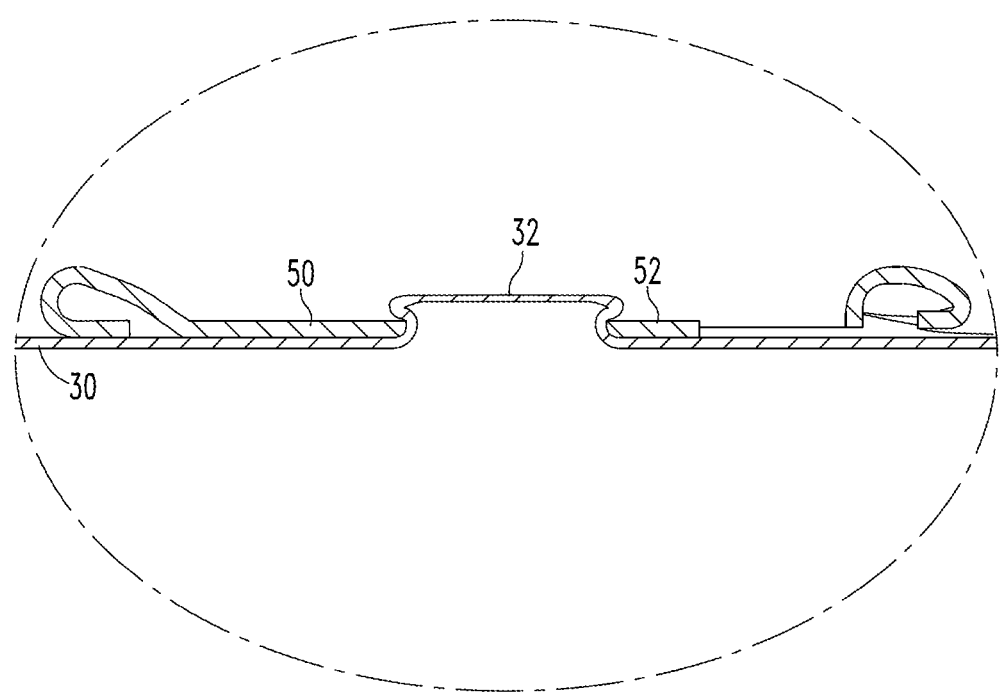
FIG. 10B is a detail, schematic cross-sectional view of an expandable rivet.
Figure 13:
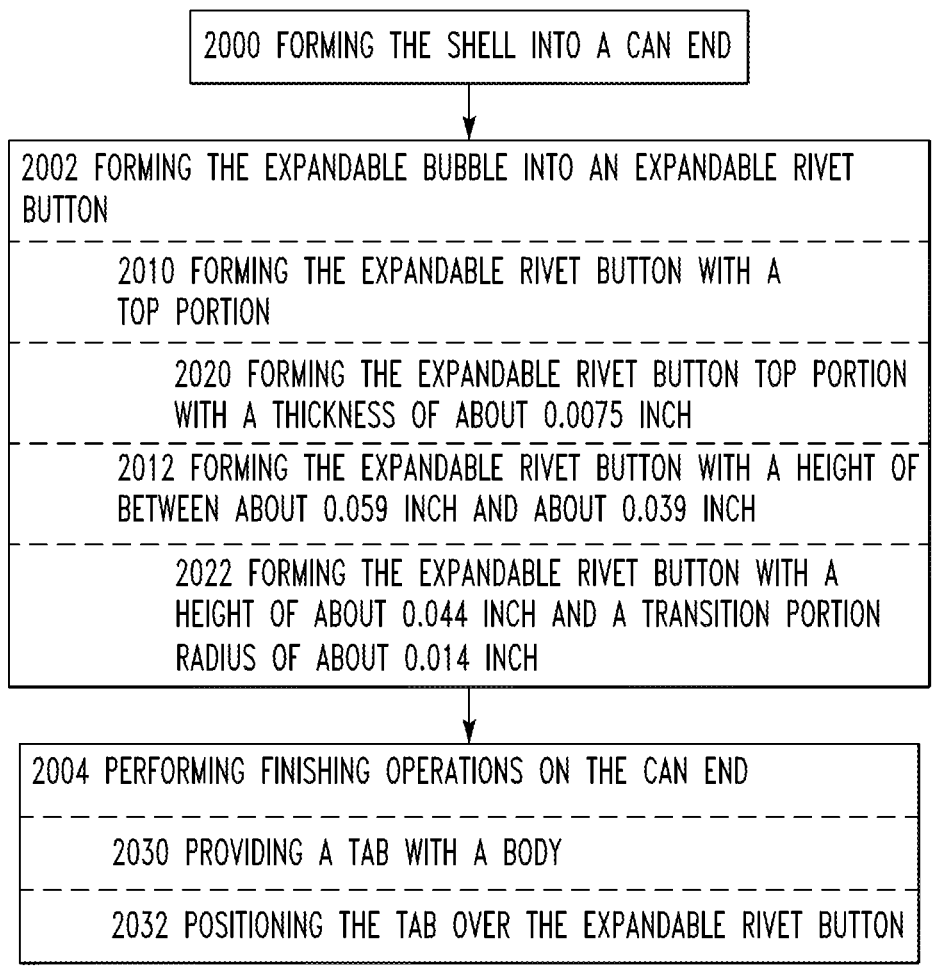
FIG. 13 is a flow chart of another disclosed method.

The method of forming a can end 30 with an expanded rivet 32 includes any of the actions described above relating to forming a shell 20 with an expandable bubble 12. This includes providing 1000 a sheet material 1 with a base thickness, forming 1002 the sheet material into a shell 20, and forming 1004 an expandable bubble 12 on the shell 20. As shown in FIG. 13, the method of forming a can end 30 with an expanded rivet 32 further includes preliminary forming 2000 the shell 20 into a can end 30 (FIG. 10B), forming 2002 the expandable bubble 12 into an expandable rivet button 22, and performing 2004 finishing operations on the shell 20/can end 30.

Forming 2002 the expandable bubble 12 into an expandable rivet button 22 includes forming 2010 the expandable rivet button 22 with a top portion 44 wherein the expandable rivet button top portion 44 has a thickness of between about 0.0073 inch and about 0.0079 inch, and forming 2012 the expandable rivet button 22 with a height of between about 0.059 inch and about 0.049 inch. In an exemplary embodiment, forming 2002 the expandable bubble 12 into an expandable rivet button 22 includes forming 2020 the expandable rivet button top portion 44 with a thickness of about 0.0075 inch, and, forming 2022 the expandable rivet button 32 with a height of about 0.044 inch and with a rivet transition portion 46 having a radius of about 0.014 inch, when viewed in cross-section, as discussed above.

In an exemplary embodiment, providing 1000 a sheet material 1 with a base thickness and forming 2000 the shell 20 into a can end 30 include providing 1020 an aluminum sheet and forming 1022 a beverage container shell 20, as described above. Further, performing 2004 finishing operations on the shell 20/can end 30 includes providing 2030 a tab 50 with a body 52, the tab body 52 including an opening 54, positioning 2032 the tab 50 over the expandable rivet button 22 with the expandable rivet button 22 extending through said tab opening 54, forming the expandable rivet button 22 into an expandable rivet 32, wherein the expandable rivet 32 has an enhanced overlap of the tab body 52.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof

What is claimed is:

1. A shell comprising:
   a central panel, said central panel having a starting base thickness prior to any forming operations of less than 0.0082 inch; and
   an expandable bubble disposed on said central panel, wherein said expandable bubble includes a head and a periphery,
   wherein said expandable bubble head has a thickness of betweeen about 0.0070 inch and 0.0079 inch, and
   wherein said expandable bubble periphery is one of an enhanced coined periphery or expanded coined periphery.

2. The shell of claim 1 wherein said central panel has a thickness of between about 0.0080 inch and about 0.0060 inch.

3. The shell of claim 2 wherein said central panel has a thickness of about 0.0078 inch.

4. The shell of claim 1 wherein:
   said expandable bubble has a height of between about 0.0750 inch and about 0.0880 inch.

5. The shell of claim 4 wherein:
   said expandable bubble head has a thickness of about 0.0076 inch; and
   said expandable bubble has a height of about 0.0859 inch.

6. The shell of claim 4 wherein said central panel is made from aluminum and is sized for a beverage container.

7. The shell of claim 4 wherein:
   said expandable bubble head has a first curvature when viewed in cross-section; and
   said enhanced coined periphery or said expanded coined periphery has a second curvature when viewed in cross-section.

8. A method of forming a shell with an expandable bubble comprising: providing a sheet material with a starting base thickness prior to any forming operations of less than 0.0082 inch; forming said sheet material into a shell; forming an expandable bubble on said shell; wherein said expandable bubble includes a head and a periphery, wherein said expandable bubble head has a thickness of between about 0.0070 inch and 0.0079 inch, and wherein said expandable bubble periphery is one of an enhanced coined periphery or expanded coined periphery and performing finishing operations on said shell.

9. The method of claim 8 wherein said step of forming an expandable bubble on said shell further comprises: forming said expandable bubble with a height of between about 0.0750 inch and about 0.0880 inch.

10. The method of claim 9 wherein said step of forming an expandable bubble on said shell further comprises:
    forming said bubble head with a thickness of about 0.0076 inch; and
    forming said expandable bubble with a height of about 0.0859 inch.

11. The method of claim 8 wherein said step of providing a sheet material with a base thickness and forming said sheet material into a shell further comprises:
    providing an aluminum sheet; and
    forming a beverage container shell.

12. The method of claim 8 wherein said step of performing finishing operations on said shell further comprises:
- forming said expandable bubble into an expandable rivet button;
- providing a tab with a body, said tab body including a coupling opening;
- positioning said tab over said expandable rivet button with said expandable rivet button extending through said tab coupling opening;
- forming said expandable rivet button into an expandable rivet; and
- wherein said expandable rivet has an enhanced overlap of said tab body.

* * * * *